US012082341B2

(12) United States Patent
Park et al.

(10) Patent No.: US 12,082,341 B2
(45) Date of Patent: Sep. 3, 2024

(54) PRINTED CIRCUIT BOARD, ANTENNA STRUCTURE INCLUDING THE SAME AND IMAGE DISPLAY DEVICE INCLUDING THE SAME

(71) Applicant: DONGWOO FINE-CHEM CO., LTD., Jeollabuk-do (KR)

(72) Inventors: Dong Pil Park, Incheon (KR); Byung Jin Choi, Incheon (KR); Na Yeon Kim, Seoul (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 158 days.

(21) Appl. No.: 17/838,374

(22) Filed: Jun. 13, 2022

(65) Prior Publication Data

US 2022/0312594 A1  Sep. 29, 2022

Related U.S. Application Data

(63) Continuation of application No. PCT/KR2020/016928, filed on Nov. 26, 2020.

(30) Foreign Application Priority Data

Dec. 11, 2019 (KR) .......................... 10-2019-0164487

(51) Int. Cl.
*H05K 1/02* (2006.01)
*H05K 1/18* (2006.01)

(52) U.S. Cl.
CPC ........... *H05K 1/181* (2013.01); *H05K 1/0281* (2013.01); *H05K 1/189* (2013.01); *H05K 2201/0141* (2013.01); *H05K 2201/10098* (2013.01); *H05K 2201/10128* (2013.01)

(58) Field of Classification Search
CPC ................. H05K 1/189; H05K 1/0281; H05K 2201/09063; H05K 1/028
See application file for complete search history.

(56) References Cited

U.S. PATENT DOCUMENTS

| 7,518,480 | B1 * | 4/2009 | Dening ............... H01F 17/0006 336/200 |
| 2006/0258187 | A1 * | 11/2006 | Behziz ................. H05K 1/0251 439/77 |
| 2021/0005968 | A1 * | 1/2021 | Park ....................... H01Q 21/08 |

FOREIGN PATENT DOCUMENTS

| CN | 1972558 A | 5/2007 |
| CN | 102771200 A | 11/2012 |
| CN | 107708286 A | 2/2018 |
| JP | 2007-089109 A | 4/2007 |

(Continued)

OTHER PUBLICATIONS

International Search Report for PCT/KR2020/016928 mailed on Mar. 12, 2021.

(Continued)

*Primary Examiner* — Sherman Ng
(74) *Attorney, Agent, or Firm* — The PL Law Group, PLLC

(57) ABSTRACT

A printed circuit board according to an embodiment of the present invention includes a core layer and a circuit wiring layer disposed on a top surface of the core layer. The core layer is spaced apart from the circuit wiring layer and includes through-holes formed around the circuit wiring layer. Flexibility of the printed circuit board may be enhanced by the through-hole to obtain bending stability.

13 Claims, 4 Drawing Sheets

(56) References Cited

FOREIGN PATENT DOCUMENTS

| | | |
|---|---|---|
| KR | 10-2003-0095557 A | 12/2003 |
| KR | 10-2015-0068789 A | 6/2015 |
| KR | 10-2017-0100749 A | 9/2017 |
| KR | 10-2018-0099220 A | 9/2018 |
| KR | 10-1940798 B1 | 1/2019 |
| KR | 10-2019-0118095 A | 10/2019 |

OTHER PUBLICATIONS

Office action issued on May 29, 2024 from China Patent Office in a counterpart China Patent Application No. 202011442591.X.

\* cited by examiner

PRINTED CIRCUIT BOARD, ANTENNA STRUCTURE INCLUDING THE SAME AND IMAGE DISPLAY DEVICE INCLUDING THE SAME

CROSS-REFERENCE TO RELATED APPLICATION AND CLAIM OF PRIORITY

The present application is a continuation application to International Application No. PCT/KR2020/016928 with an International Filing Date of Nov. 26, 2020, which claims the benefit of Korean Patent Applications No. 10-2019-0164487 filed on Dec. 11, 2019 at the Korean Intellectual Property Office, the disclosures of which are incorporated by reference herein in their entirety.

BACKGROUND

1. Field

The present invention relates to a printed circuit board, an antenna structure including the same and an image display device including the same. More particularly, the present invention relates to a printed circuit board including an insulation layer and a circuit wiring, an antenna structure including the same and an image display device including the same.

2. Description of the Related Art

As information technologies have been developed, a wireless communication technology such as Wi-Fi, Bluetooth, etc., is combined with an image display device in, e.g., a smartphone form. In this case, an antenna may be combined with the image display device to provide a communication function.

As mobile communication technologies have been rapidly developed, an antenna capable of operating a high frequency or ultra-high frequency communication is needed in the display device.

The antenna may be connected to a driving integrated circuit chip through, e.g., a flexible printed circuit board (FPCB). To prevent a signal loss through the FPCB, a dielectric constant of an insulating layer included in the FPCB may be adjusted. Additionally, when a high-temperature process is included for mounting the driving IC chip, sufficient high-temperature stability of the insulating layer is required.

As display devices having flexible properties such as a flexible display or a foldable display have recently been developed, high flexibility may be also required in a structure including the antenna and the FPCB.

For example, Korean Published Patent Application No. 2003-0095557 discloses an antenna structure embedded in a portable terminal, but fails to consider a property of the circuit board.

SUMMARY

According to an aspect of the present invention, there is provided a printed circuit board having improved mechanical and electrical reliability.

According to an aspect of the present invention, there is provided an antenna structure including a printed circuit board with improved mechanical and electrical reliability.

According to an aspect of the present invention, there is provided an image display device including the antenna structure.

(1) A printed circuit board, including: a core layer; and a circuit wiring layer disposed on a top surface of the core layer, wherein the core layer is spaced apart from the circuit wiring layer and includes through-holes formed around the circuit wiring layer.

(2) The printed circuit board according to the above (1), wherein the through-holes completely penetrate the core layer.

(3) The printed circuit board according to the above (1), wherein the core layer includes a bending area, and the through-holes are formed in a bending area of the core layer.

(4) The printed circuit board according to the above (1), wherein the circuit wiring layer includes a signal pad; a signal line, merging lines and feeding lines sequentially extending from the signal pad and connected to each other; and feeding pads connected to each terminal end portion of the feeding lines.

(5) The printed circuit board according to the above (4), wherein the through-holes are formed around the signal line and the merging lines.

(6) The printed circuit board according to the above (5), wherein the through-holes are not formed around the feeding pads.

(7) The printed circuit board according to the above (4), wherein the through-holes are formed in an intermediate area between an area adjacent to the signal pad and an area adjacent to the feeding pads of the printed circuit board.

(8) The printed circuit board according to the above (1), further including a lower ground layer formed on a bottom surface of the core layer.

(9) The printed circuit board according to the above (8), wherein the through-holes penetrate through the core layer and the lower ground layer.

(10) The printed circuit board according to the above (8), further comprising an upper ground layer disposed on the top surface of the core layer and spaced apart from the circuit wiring layer.

(11) The printed circuit board according to the above (10), wherein the through-holes penetrate through the upper ground layer and the core layer.

(12) The printed circuit board according to the above (1), wherein the core layer includes a liquid crystal polymer having a dielectric constant of 3 or less.

(13) The printed circuit board according to the above (1), wherein a plurality of the through-holes are arranged in a width direction of the printed circuit board to define a through-hole row, and a plurality of the through-hole rows are repeatedly arranged in a length direction of the printed circuit board.

(14) An antenna structure, including: the printed circuit board according to embodiments as described above; and an antenna unit electrically connected to one end portion of the circuit wiring layer of the printed circuit board.

(15) An image display device including the antenna structure according to embodiments as described above.

According to exemplary embodiments of the present invention, through-holes penetrating a printed circuit board may be formed around circuit wirings connected to an antenna unit. An area of the printed circuit board in which the through-holes are formed may serve as a bending area. A bending stress may be reduced by the through-holes, so that damages to the printed circuit board and the circuit wiring during bending or folding may be prevented.

The bending stress may be reduced by the through-holes, so that a core layer including a material having a low dielectric constant and a high heat resistance such as, e.g., a liquid crystal polymer may be employed. Thus, a printed circuit board having high flexibility while improving radiation properties of the antenna unit may be achieved.

DETAILED DESCRIPTION OF THE EMBODIMENTS

According to exemplary embodiments of the present invention, there is provided a printed circuit board including through-holes and having improved bending property, and an antenna structure including the printed circuit board. Further, an image display device to which the printed circuit board or the antenna structure applied is also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms "first", "second", "upper", "lower", "top" and "bottom" used in this application are not intended to designate an absolute position, but are intended to distinguish different elements or designate relative positions.

Figure 1:
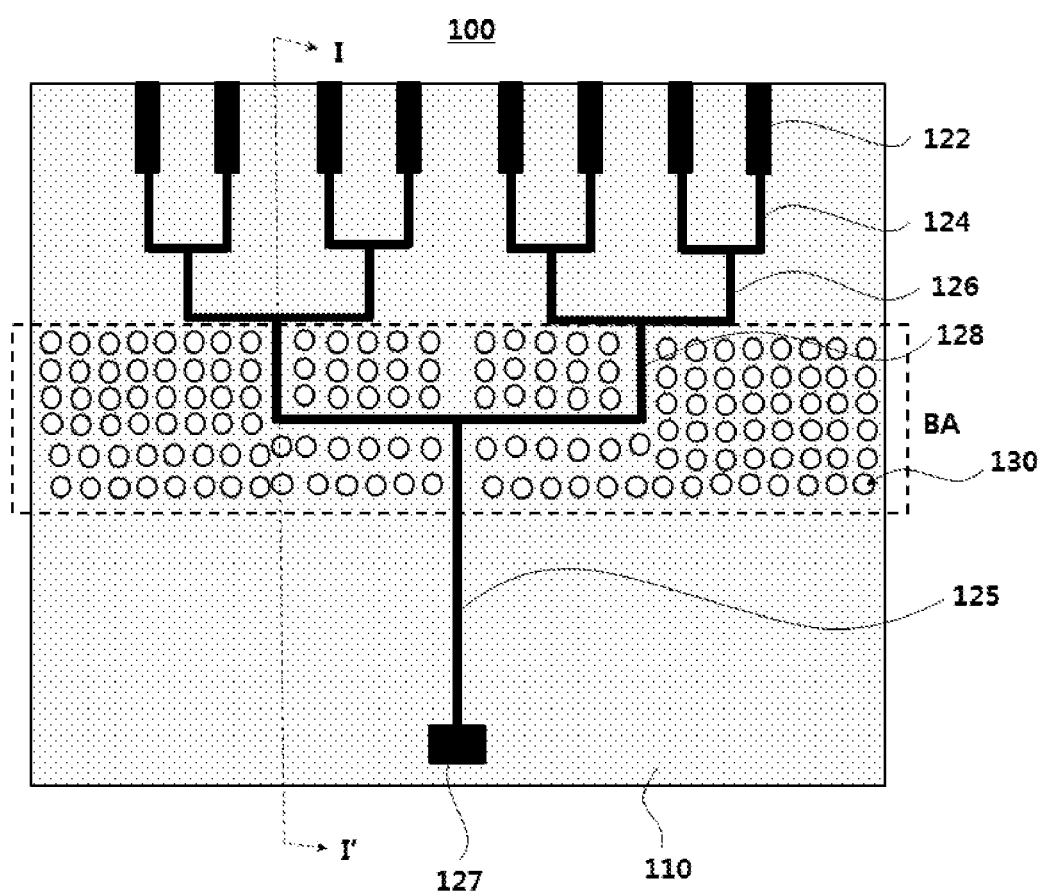
FIGS. 1 and 2 are a schematic top planar view and a schematic cross-sectional view, respectively, illustrating a printed circuit board in accordance with exemplary embodiments.
Figure 2:
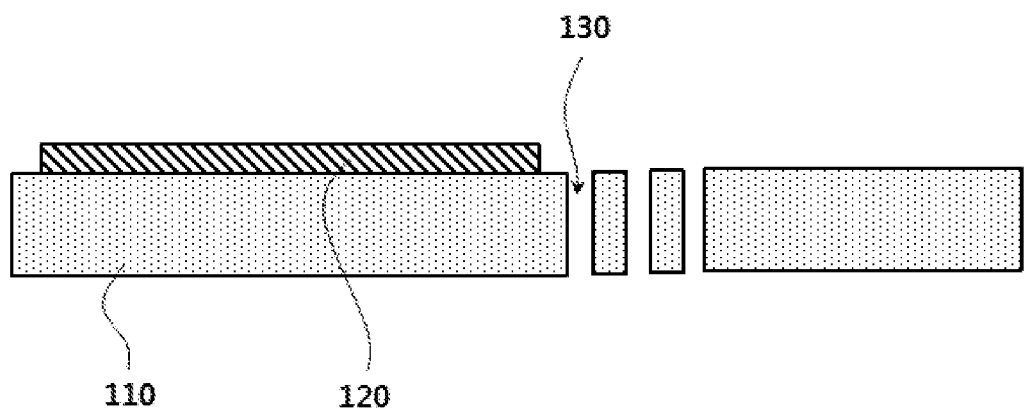

FIGS. 1 and 2 are a schematic top planar view and a schematic cross-sectional view, respectively, illustrating a printed circuit board in accordance with exemplary embodiments. For example, FIG. 2 is a cross-sectional view taken along a line I-I' of FIG. 1 in a thickness direction.

Referring to FIGS. 1 and 2, a printed circuit board 100 may include a core layer 110 and a circuit wiring layer 120.

The core layer 110 may include a flexible resin material. Accordingly, the printed circuit board 100 may be provided as a flexible printed circuit board (FPCB).

Non-limiting examples of the core layer 110 may include polyimide, epoxy, polyurethane, polyethylene terephthalate, cyclic olefin polymer (COP), liquid crystal polymer (LCP), modified polyimide (MPI), etc.

In some embodiments, the core layer 110 may include LCP. Preferably, a dielectric constant of the core layer 110 may be about 3 or less (e.g., about 1 to 3). In this case, signal transmission loss from the printed circuit board 100 may be reduced, and a feeding efficiency and a gain property of an antenna unit 200 (see FIG. 5) connected to the printed circuit board 100 may be increased.

The circuit wiring layer 120 may include a feeding pad 122, a feeding line 124, merging lines 126 and 128, and a signal line 125. A signal pad 127 may be connected to an end of the signal line 125.

The feeding pad 122 may be electrically connected to each antenna unit. The feeding line 124 may be connected to each feeding pad 122.

In exemplary embodiments, a plurality of the feeding pads 122 may be coupled through the feeding line 124 to form one feeding unit. For example, a pair of the feeding pads 122 neighboring each other and a pair of the feeding lines 124 may define one feeing unit.

In some embodiments, a plurality of the feeding units may be merged through a first merging line 126. For example, a pair of the feeding units neighboring each other may be coupled through the first merging line 126 to form one sub-feeding group.

In some embodiments, a plurality of the sub-feeding groups may be merged through a second merging line 128. For example, a pair of the sub-feeding groups neighboring each other may be coupled through the second merging line 128 to form one feeding group.

Accordingly, the feeding group controlled/fed through one signal pad 127 may be defined. For example, the feeding group including four feeding units each including a pair of the feeding pads 122 may be defined by the signal line 125 extending from the signal pad 127.

The signal pad 127 may serve as, e.g., a bonding pad electrically connected to a driving integrated circuit (IC) chip.

The arrangement and construction of the circuit wiring layer 120 as described above with reference to FIG. 1 are provided as an example, and may be properly modified in consideration of the number of the antenna units 200, shape/dimension of an image display device, etc.

The printed circuit board 100 may include a plurality of through-holes 130 penetrating the core layer 110. In exemplary embodiments, the through-holes 130 may be formed in a bending area BA where the printed circuit board 100 is bent or folded.

For example, a plurality of the through-holes may be arranged in a row direction (e.g., in a width direction of the printed circuit board 100) to form a through-hole row, and a plurality of the through-hole rows may be arranged in a column direction (e.g., in a length direction of the printed circuit board 100).

The through-holes 130 may be arranged around the circuit wiring layer 120 so as not to penetrate the circuit wiring layer 120. In some embodiments, the through-holes 130 may be arranged around the signal line 125 and/or the merging lines 126 and 128.

In an embodiment, the through-holes 130 may be arranged throughout a region in which the signal line 125 and the second merging line 128 are connected to each other.

In some embodiments, the through-holes 130 may not be arranged around the feeding pad 122 and/or the feeding line 124. Accordingly, while a high-temperature bonding process of the feeding pad 122 and the antenna unit 200, sufficient heat resistance may be achieved from the core layer 110.

In an embodiment, the through-holes 130 may also be formed around the feeding pad 122 and/or the feeding line 124. In this case, a dielectric constant of the core layer 110 may be additionally lowered by the through-holes 130.

According exemplary embodiments as described above, the through-holes 130 may be distributed in the bending area BA of the printed circuit board 100, so that flexibility may be selectively improved in the bending area BA. Thus, even when a material having relatively high hardness and brittleness such as the LCP is included in the core layer 110, a stress in the bending area BA may be alleviated.

Therefore, even though a bending stress is applied, mechanical stability and reliability of the printed circuit board 100 may be achieved. Additionally, a low-dielectric, high-heat resistant material such as the LCP may be employed for the core layer 110. Accordingly, signal transmission loss from the printed circuit board 100 to the antenna unit 200 may be suppressed, and sufficient bonding reliability in the bonding area with the antenna unit 200 including the feeding pad 122 may be achieved.

Figure 3:
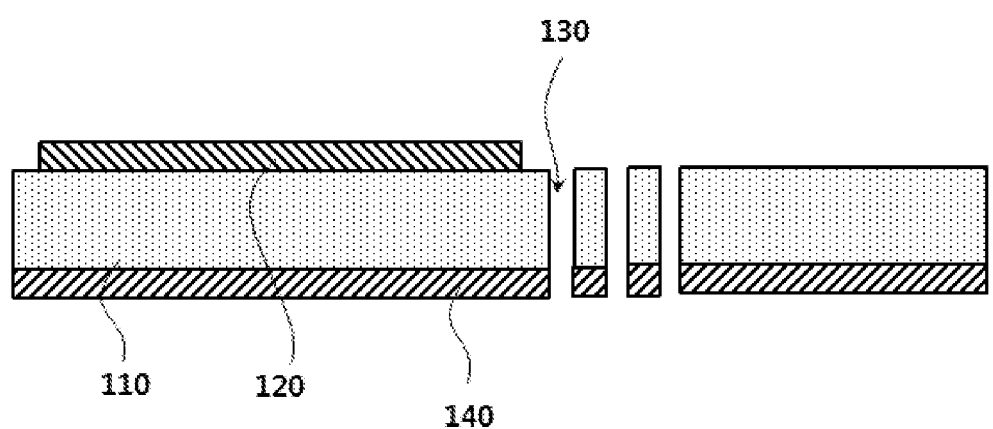
FIG. 3 is a schematic cross-sectional view illustrating a printed circuit board in accordance with some exemplary embodiments.

FIG. 3 is a schematic cross-sectional view illustrating a printed circuit board in accordance with some exemplary embodiments. Detailed descriptions of elements and structures substantially the same as or similar to those described with reference to FIGS. 1 and 2 are omitted herein.

Referring to FIG. 3, the printed circuit board 100 may further include a lower ground layer 140 formed on a bottom surface of the core layer 100.

For example, the lower ground layer 140 may face the circuit wiring layer 120 with the core layer 100 interposed therebetween. Noises around the circuit wiring layer 120 may be absorbed or shielded by the lower ground layer 140. Accordingly, reliability of feeding/signal transmission between the driving IC chip and the antenna unit 200 may be further improved.

The through-holes 130 may penetrate commonly through the core layer 110 and the lower ground layer 140. Accordingly, even though the ground layer 140 is included in the bending area BA, sufficient flexibility may be provided.

Figure 4:
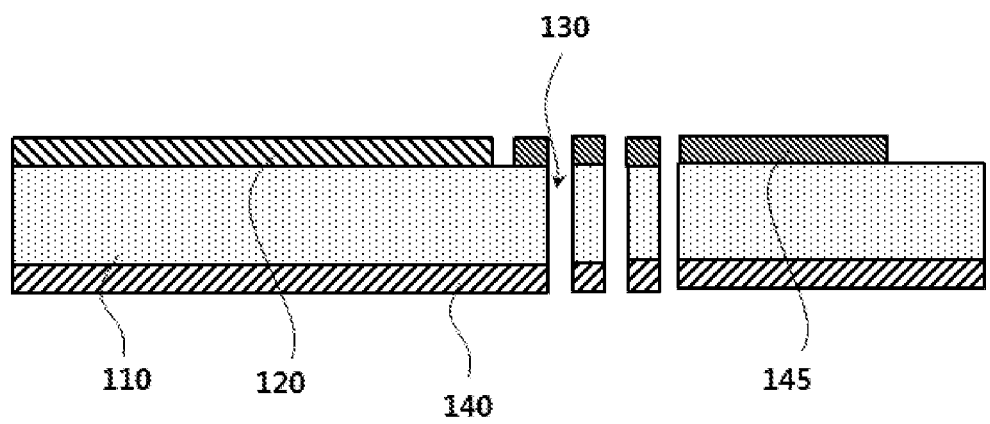
FIG. 4 is a schematic cross-sectional view illustrating a printed circuit board in accordance with some exemplary embodiments.

FIG. 4 is a schematic cross-sectional view illustrating a printed circuit board in accordance with some exemplary embodiments. Detailed descriptions of elements and structures substantially the same as or similar to those described with reference to FIGS. 1 and 2 are omitted herein.

Referring to FIG. 4, an upper ground layer 145 may be formed on a top surface of the core layer 110. For example, the upper ground layer 145 may be disposed on the top surface of the core layer 110 to be spaced apart from the circuit wiring layer 120 around the circuit wiring layer 120.

In some embodiments, the through-holes 130 may penetrate commonly through the upper ground layer 145, the core layer 110, and the lower ground layer 140.

Figure 5:
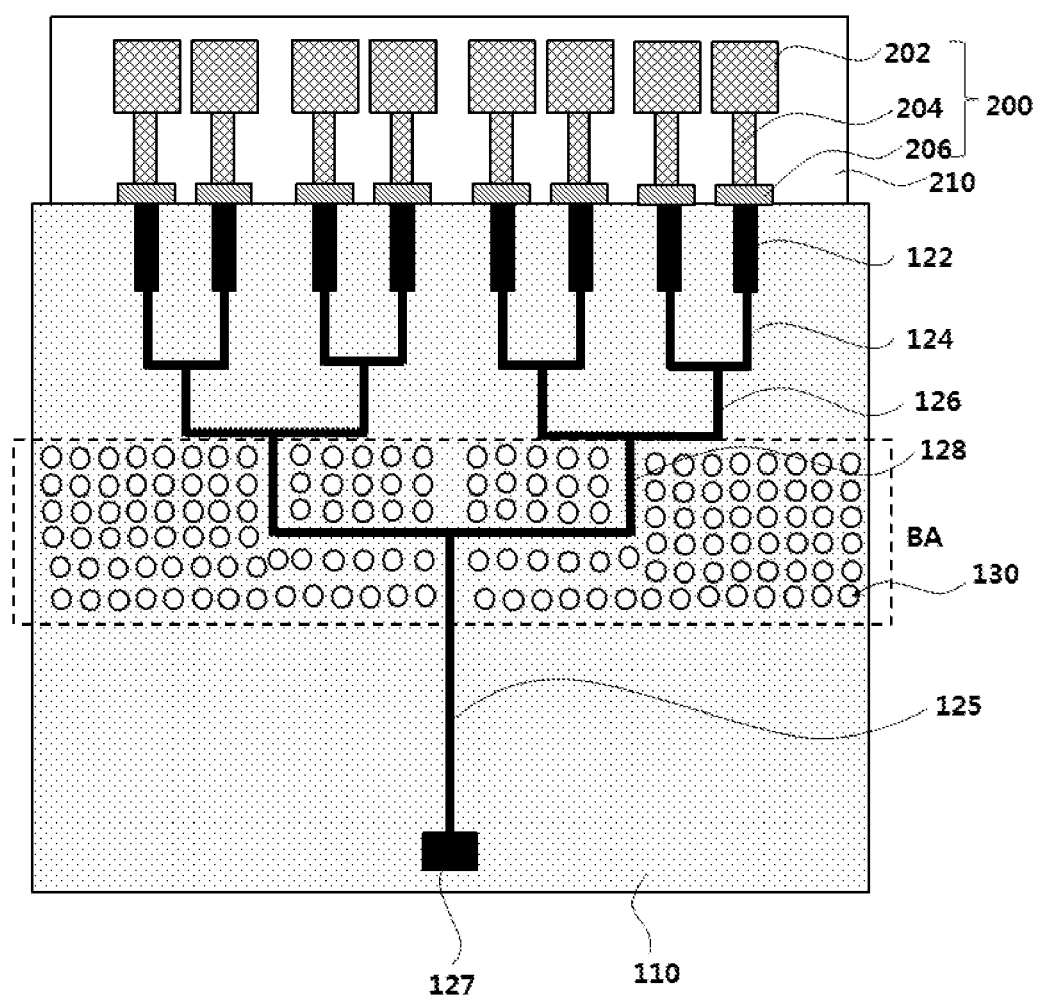
FIG. 5 is a schematic top planar view illustrating an antenna structure in accordance with exemplary embodiments.

FIG. 5 is a schematic top planar view illustrating an antenna structure in accordance with exemplary embodiments.

Referring to FIG. 5, the printed circuit board 100 described with reference to FIGS. 1 to 4 may be electrically connected to the antenna unit 200 through the feeding pad 122. Accordingly, an antenna structure in which the printed circuit board 100 and the antenna unit 200 are combined with each other may be provided.

The antenna structure may include an antenna unit 200 for realizing high-frequency or ultra-high frequency communication of, e.g., 3G, 4G, 5G or more.

The antenna unit 200 may include a radiator 202, a transmission line 204 and an antenna pad 206.

The radiator 202 may have, e.g., a polygonal plate shape, and the transmission line 204 may extend from one side of the radiator 202 to be electrically connected to the antenna pad 206. The transmission line 204 may be formed as a single member substantially integral with the radiator 202.

In an embodiment, a ground pad may be disposed around the antenna pad 206.

The antenna unit layer 200 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals.

For example, the radiator 200 may include silver (Ag) or a silver alloy (e.g., a silver-palladium-copper (APC) alloy), or copper (Cu) or a copper alloy (e.g., a copper-calcium (CuCa) alloy) to implement a low resistance and a fine line width pattern.

In some embodiments, the antenna unit 200 may include a transparent conductive oxide such as indium tin oxide (ITO), indium zinc oxide (IZO), zinc oxide (ZnO), indium zinc tin oxide (ITZO), cadmium tin oxide (CTO), etc.

In some embodiments, the radiator 202 and/or the transmission line 204 may have, e.g., a double-layered structure of a metal layer-transparent conductive oxide layer or a triple-layered structure of a transparent conductive oxide layer-metal layer-transparent conductive oxide layer. In this case, flexible property may be improved and resistance may be lowered by the metal layer while enhancing corrosion resistance and transparency by the transparent conductive oxide layer.

In some embodiments, the radiator 202 and/or the transmission line 204 may include a mesh structure. The radiator 202 may include the mesh structure, so that transmittance may be improved when the radiator 202 is disposed in a display area of an image display device, thereby preventing an electrode visibility and degradation of an image quality.

In some embodiments, the antenna pad 206 and the feeding pad 122 of the printed circuit board 100 may be bonded to each other through a conductive intermediate structure such as an anisotropic conductive film (ACF). The antenna pad 206 may be formed as a solid metal pattern to reduce a contact resistance or a feeding resistance.

As illustrated in FIG. 5, in a bonding area connected to the antenna unit 200 around the feeding pad 122, thermal and mechanical stability may be maintained by the core layer 110 in which the through-holes 130 may not be formed.

In a bending area BA of the printed circuit board 100, the through-holes 130 may be formed to provide sufficient flexibility of the bending area BA, thereby mechanical damages such as cracks and delamination of the circuit wiring layer 120 caused while being bent may be prevented.

In some embodiments, the through-holes 130 may not be formed in a region adjacent to the signal pad 127 of the printed circuit board 100. Accordingly, the through-holes 130 may be selectively formed in an intermediate region between both end regions connected to the antenna unit 200 and a driving IC chip.

In some embodiments, the antenna unit 200 may be disposed on a dielectric layer 210. For example, the dielectric layer 210 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination of two or more thereof.

In some embodiments, an adhesive material such as an optically clear adhesive (OCA), an optically clear resin (OCR), or the like may be included in the dielectric layer 210.

In some embodiments, the dielectric layer 210 may include an inorganic insulating material such as silicon oxide, silicon nitride, silicon oxynitride or glass.

In some embodiments, a dielectric constant of the dielectric layer 210 may be adjusted in a range from about 1.5 to 12. When the dielectric constant exceeds about 12, a driving frequency may be excessively increased and a driving in a desired high frequency band may not be implemented.

Figure 6:
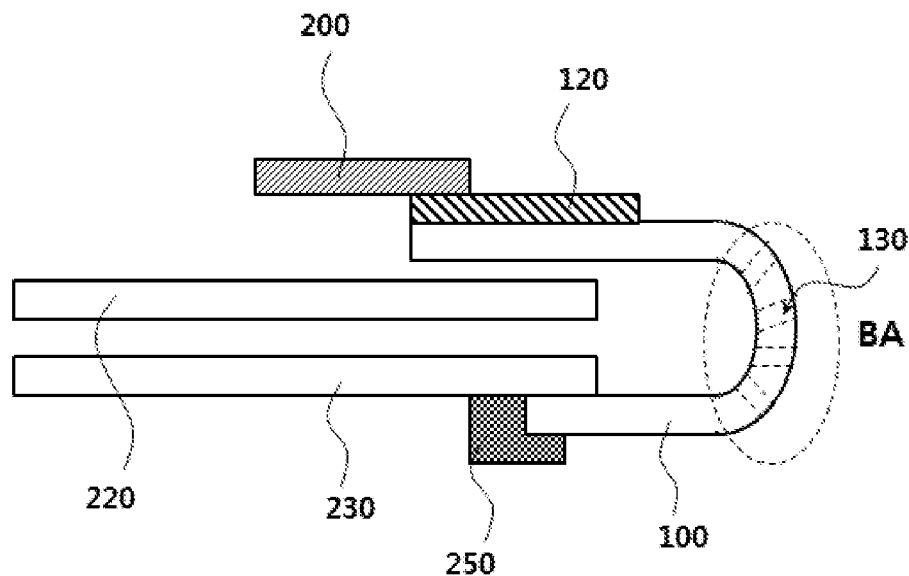
FIG. 6 is a schematic cross-sectional view illustrating a bent shape of an antenna structure in accordance with exemplary embodiments.

FIG. 6 is a schematic cross-sectional view illustrating a bent shape of an antenna structure in accordance with exemplary embodiments.

Referring to FIG. 6, the printed circuit board 100 may be connected to the antenna unit 200 via the circuit wiring layer 120 as described above, and the printed circuit board 100 may be bent downwardly by the bending area BA in which the through-holes 130 may be formed.

For example, the printed circuit board 100 may be bent toward a main board 230 disposed under a display panel 220. For example, a driving IC chip 250 disposed on the main board 230 may be connected to the circuit wiring layer 120 via the signal pad 127 included in the printed circuit board 100 to perform a feeding to the antenna unit 200.

Figure 7:
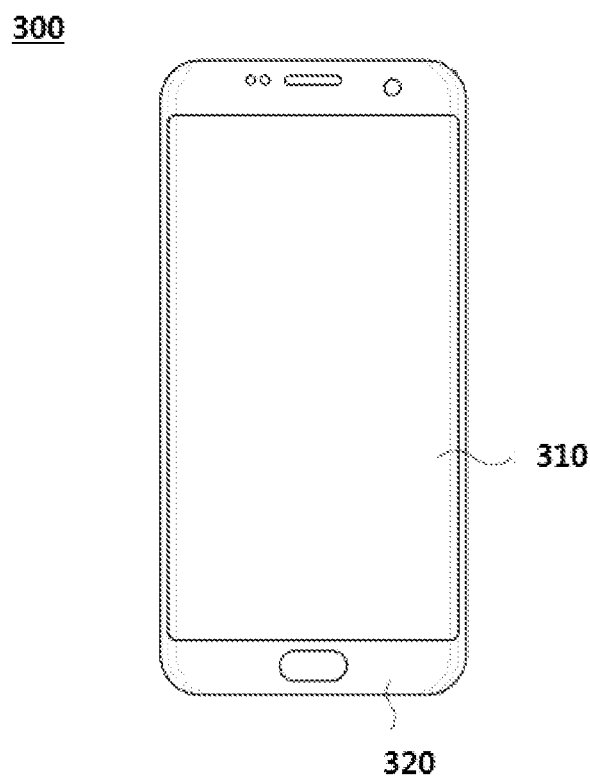
FIG. 7 is a schematic top planar view illustrating an image display device in accordance with some exemplary embodiments.

FIG. 7 is a schematic top planar view illustrating an image display device in accordance with some exemplary embodiments.

Referring to FIG. 7, an image display device 300 may be implemented in the form of, e.g., a smart phone, and FIG. 7 shows a front face portion or a window surface of the image display device 300. The front face portion of the image display device may include a display area 310 and a peripheral area 320. The peripheral area 320 may correspond to, e.g., a light-shielding portion or a bezel portion of an image display device.

The antenna unit 200 included in the above-described antenna structure may be disposed toward the front face portion of the image display device, and may be disposed on, e.g., a display panel. In an embodiment, the radiator 202 may overlap the display area 310. In this case, the radiator 202 may include a mesh structure, and a reduction of transmittance due to the radiator 202 may be prevented.

The driving IC chip 250 may be disposed in the peripheral area 320 to prevent deterioration of the image quality in the display area 310. In this case, the printed circuit board 100 may be bent by the bending area BA in which the through-holes 130 may be formed to be electrically connected to the driving IC chip 250.

As described above, the printed circuit board 100 may be bent without damages while maintaining a connection reliability with the antenna unit 200, and thus the image display device equipped with a thin, high-reliability communication function may be implemented.

What is claimed is:
1. A printed circuit board, comprising:
a core layer; and
a circuit wiring layer disposed on a top surface of the core layer,
wherein the core layer is spaced apart from the circuit wiring layer and includes through holes formed around the circuit wiring layer,
wherein the circuit wiring layer comprises:
a signal pad;
a signal line, merging lines and feeding lines sequentially extending from the signal pad and connected to each other; and
feeding pads connected to each terminal end portion of the feeding lines,
wherein the through holes are formed around the signal line and the merging lines.
2. The printed circuit board according to claim 1, wherein the through holes completely penetrate the core layer.
3. The printed circuit board according to claim 1, wherein the core layer includes a bending area, and the through holes are formed in a bending area of the core layer.
4. The printed circuit board according to claim 1, wherein the through holes are not formed around the feeding pads.
5. The printed circuit board according to claim 1, further comprising a lower ground layer formed on a bottom surface of the core layer.
6. The printed circuit board according to claim 5, wherein the through holes penetrate through the core layer and the lower ground layer.
7. The printed circuit board according to claim 5, further comprising an upper ground layer disposed on the top surface of the core layer and spaced apart from the circuit wiring layer.
8. The printed circuit board according to claim 7, wherein the through holes penetrate through the upper ground layer and the core layer.
9. The printed circuit board according to claim 1, wherein the core layer includes a liquid crystal polymer having a dielectric constant of 3 or less.
10. The printed circuit board according to claim 1, wherein a plurality of the through holes are arranged in a width direction of the printed circuit board to define a through hole row, and a plurality of the through hole rows are repeatedly arranged in a length direction of the printed circuit board.
11. An antenna structure, comprising:
the printed circuit board according to claim 1; and
an antenna unit electrically connected to one end portion of the circuit wiring layer of the printed circuit board.
12. An image display device comprising the antenna structure of claim 11.
13. A printed circuit board, comprising:
a core layer; and
a circuit wiring layer disposed on a top surface of the core layer,
wherein the core layer is spaced apart from the circuit wiring layer and includes through holes formed around the circuit wiring layer,
wherein the circuit wiring layer comprises:
a signal pad;
a signal line, merging lines and feeding lines sequentially extending from the signal pad and connected to each other; and
feeding pads connected to each terminal end portion of the feeding lines,
wherein the through holes are formed in an intermediate area between an area adjacent to the signal pad and an area adjacent to the feeding pads of the printed circuit board.

* * * * *